United States Patent [19]

Mooi

[11] 4,252,632

[45] Feb. 24, 1981

[54] CATALYST AND PROCESS FOR CONVERSION OF HYDROCARBONS

[75] Inventor: John Mooi, Homewood, Ill.

[73] Assignee: Atlantic Richfield Company, Philadelphia, Pa.

[21] Appl. No.: 681,657

[22] Filed: Apr. 29, 1976

[51] Int. Cl.$^3$ .................. C10G 11/18; B01J 29/12; C01B 17/60

[52] U.S. Cl. .................. 208/120; 208/113; 252/417; 252/455 Z; 252/477 R

[58] Field of Search ........................ 208/120

[56] References Cited

U.S. PATENT DOCUMENTS

| | | | |
|---|---|---|---|
| 2,436,927 | 3/1948 | Kassel | 252/417 |
| 3,312,615 | 4/1967 | Cramer et al. | 208/120 |
| 3,364,136 | 1/1968 | Chen et al. | 208/120 |
| 3,554,900 | 1/1971 | Bowes | 208/111 |
| 3,699,037 | 10/1972 | Annesser et al. | 208/120 |
| 3,755,535 | 8/1973 | Naber | 423/244 |
| 3,788,977 | 1/1974 | Dolbear et al. | 208/120 |
| 3,909,392 | 9/1975 | Horecky et al. | 208/120 |
| 3,926,778 | 12/1975 | Owen et al. | 208/74 |
| 3,949,684 | 4/1976 | Copeland | 423/244 X |
| 4,064,039 | 12/1977 | Penick | 208/160 |
| 4,072,600 | 2/1978 | Schwartz | 208/120 |
| 4,115,250 | 9/1978 | Flanders et al. | 208/120 |
| 4,118,430 | 10/1978 | Mooi | 208/120 X |
| 4,148,751 | 4/1979 | Hemler et al. | 208/120 X |
| 4,151,121 | 4/1979 | Gladrow | 208/120 X |
| 4,153,535 | 5/1979 | Vasalos et al. | 208/120 |

FOREIGN PATENT DOCUMENTS

| | | | |
|---|---|---|---|
| 820181 | 3/1975 | Belgium | 208/120 |
| 2444911 | 4/1975 | Fed. Rep. of Germany | 208/120 |
| 2507343 | 2/1975 | Fed. Rep. of Germany | 252/417 |

OTHER PUBLICATIONS

NE 1,499,682 (2/1978), United Kingdom, Bertolacini et al., This British Pat. can serve as "Translation" of ref. N, the German equiv., both are on priority of U.S. Ser. No. 447,753, filed 4 Mar. 1975.

*Primary Examiner*—Delbert E. Gantz
*Assistant Examiner*—G. E. Schmitkons
*Attorney, Agent, or Firm*—Frank J. Uxa

[57] ABSTRACT

An improved process for converting hydrocarbons using a catalyst which is periodically regenerated to remove carbonaceous deposits, the catalyst being comprised of a mixture containing, as a major component, solid particles capable of promoting hydrocarbon conversion at hydrocarbon conversion conditions, and, as a minor component, discrete entities comprising a major amount of alumina and a minor, catalytically effective amount of at least one platinum group metal component disposed on the alumina, the platinum group metal component being capable of promoting the oxidation of carbon monoxide to carbon dioxide at carbon monoxide oxidizing conditions.

An improved hydrocarbon conversion-carbon monoxide oxidation catalyst is also disclosed.

16 Claims, No Drawings

CATALYST AND PROCESS FOR CONVERSION OF HYDROCARBONS

This invention relates to the conversion of hydrocarbons and more particularly to the chemical conversion of hydrocarbons promoted by catalyst which is periodically regenerated to remove carbonaceous deposits.

The terms "hydrocarbon conversion" and "hydrocarbon chemical conversion" as used herein, in general, refer to those chemical reactions for improving the octane number of gasoline or converting heavy hydrocarbons to light, low boiling hydrocarbons, or converting one or more hydrocarbons to one or more different hydrocarbon products. Hence, among those reactions included in such terms are isomerization, cracking, polymerization, alkylation, dealkylation, disproportionation and the like. Each of these "hydrocarbon conversions" is preferably carried out in the substantial absence of added free molecular hydrogen.

Each such "hydrocarbon conversion" is often carried out commercially by contacting a hydrocarbon feedstock with a solid catalytic material at conditions at which the desired hydrocarbon chemical conversion takes place. However, such conditions also allow formation of carbonaceous material, such as coke, which deposits on the catalyst. These deposits are periodically removed as they tend to inactivate the catalyst. The catalyst may be regenerated by burning or combusting at least a portion of such carbonaceous deposit material from the catalyst in the presence of free oxygen. During the catalyst regeneration carbon monoxide and carbon dioxide are often produced as gaseous combustion products, the relative amounts of each depending upon the efficiency of the oxidation step.

Recent federal and local air pollution control legislation has made it necessary to eliminate or drastically reduce the amount of carbon monoxide being discharged into the atmosphere. The amount of carbon monoxide as a gaseous by-product from hydrocarbon conversion processes using a regenerative catalyst can be reduced by using a catalyst which contains a promoter, usually a metal or metal compound, for the conversion of carbon monoxide to carbon dioxide. U.S. Pat. No. 2,647,860 describes a hydrocarbon cracking process using a synthetic silica-alumina catalyst which is capable of regeneration, and which contains 0.01% to 1% by weight of chromic oxide to promote the oxidation of carbon monoxide in the catalyst regenerator. This patent acknowledges the fact that the chromic acid adversely affects the cracking reaction. U.S. Pat. No. 3,140,249 describes the preparation and use of crystalline aluminosilicate compositions containing small amounts of metals such as vanadium and manganese in hydrocarbon cracking processes. U.S. Pat. No. 3,140,253 discloses the preparation and use of crystalline aluminosilicates in hydrocarbon conversion processes. This patent states that metal promoters such as chromium, cobalt and platinum may be present in the catalyst in amounts of 5% to 40% by weight. U.S. Pat. No. 3,173,854 describes a process for the hydrocracking of hydrocarbon oils using a crystalline aluminosilicate containing, as a hydrogenation component, 0.01% to 25% by weight of a metal selected from Groups VI and VIII of the Periodic Table. U.S. Pat. No. 3,650,990 discloses the preparation of a crystalline aluminosilicate useful for the conversion of hydrocarbons containing a metal promoter selected from Groups IVB, VB, VIB, VIIB and VIII of the Periodic Chart. The metal is incorporated into the crystaline aluminosilicate prior to or during its formation and may vary from 0.001% to 5% by weight. U.S. Pat. No. 3,788,977 describes hydrocarbon cracking using a platinum-impregnated crystalline aluminosilicate catalyst. The platinum which is present in amounts of 0.5 ppm. or more increases the yield of aromatic product.

U.S. Pat. No. 3,364,136 describes hydrocarbon conversion using a catalyst comprised of a first component consisting of solid particles containing a crystalline aluminosilicate which is active for the conversion of the hydrocarbon, and a second component consisting of solid particles containing a crystalline aluminosilicate which is inert with respect to the hydrocarbon conversion reaction because its pores are too small to admit the hydrocarbon reactant, but which is effective to promote the oxidation of carbon monoxide to carbon dioxide. The latter component contains from less than 0.01% up to 20% by weight of a metal, metal oxide or metal sulfide from Groups IB, IIB, VIB, VIIB or VIII of the Periodic Chart. Belgian Patent 820,181 (now U.S. Pat. No. 4,088,568) describes a process for cracking hydrocarbons with a cracking catalyst material which contains less than the 100 ppm. of a metal chosen from Periods 5 and 6 of Group VIII of the Periodic Chart or rhenium. This patent teaches that the metal may be applied uniformly over all of the catalyst or it may be applied at a higher concentration on a portion of the catalyst and blended with unmodified catalyst provided that the total metal content of the final catalyst mixture does not exceed 100 ppm.

Such carbon monoxide oxidation catalyst systems have met with varying degress of success. One problem which has become apparent is the tendency of such oxidation catalysts to rapidly deactivate. This tendency is especially apparent when the oxidation catalyst comprises a Group VIII, platinum group metal component. Thus, carbon monoxide oxidation catalysts which are satisfactory, e.g., reduce carbon monoxide emissions to meet or approach governmental standards, in the virgin state, have been found to lose a substantial amount of carbon monoxide oxidation activity after a relatively short time in hydrocarbon conversion-catalyst regeneration service.

Accordingly, one object of this invention is to provide an improved process for hydrocarbon conversion. Another object of the invention is to provide an improved process for hydrocarbon conversion in the substantial absence of added free molecular hydrogen. Another object of this invention is to provide an improved process for hydrocarbon conversion in a two-step chemical conversion-catalyst regeneration process. A still further object of this invention is to reduce the amount of carbon monoxide produced during the regeneration of a hydrocarbon conversion catalyst. An additional object of this invention is to reduce the emission of carbon monoxide into the atmosphere from a hydrocarbon conversion process using a catalyst which is periodically regenerated to combust carbonaceous deposit material from the catalyst. Another object of the invention is to provide an improved hydrocarbon conversion catalyst. A further object of the invention is to provide an improved carbon monoxide oxidation catalyst. These and other objects of the invention will become apparent from the following description and examples.

In accordance with the invention, the hydrocarbon conversion process is carried out using a mixture of solid particles comprised of (1) a major amount of solid particles capable of promoting the desired hydrocarbon chemical conversion at hydrocarbon conversion conditions and which are, preferably, substantially free of Group VIII, platinum group metal component or components and (2) a minor amount of discrete entities comprising (A) a major amount by weight of alumina and (B) a minor, catalytically effective amount of at least one Group VIII, platinum group metal component disposed, preferably substantially uniformly disposed, on the alumina, this metal component being capable of promoting the oxidation of carbon monoxide to carbon dioxide at carbon monoxide oxidizing conditions. The Group VIII, platinum group metals include platinum, palladium, osmium, iridium, ruthenium, and rhodium. The preferred platinum group metals are palladium and platinum, most preferably platinum. The preferred relative amounts of the solid particles and discrete entities are about 80 to about 99 parts and about 1 to about 20 parts by weight, respectively. This catalyst system is especially effective for the catalytic cracking of a hydrocarbon feedstock to lighter, lower boiling products. The present catalyst system has improved properties. For example, this catalyst system has improved carbon monoxide oxidation catalytic activity stability.

The improvement of this invention can be used to advantage with the catalyst being disposed in any conventional reactor-regenerator system, e.g., in a fixed catalyst bed conversion-regeneration system, in ebullating catalyst bed systems, in systems which involve continuously conveying or circulating catalyst between reaction zone and regeneration zone and the like. Circulating catalyst systems are preferred. Typical of the circulating catalyst bed systems are the conventional moving bed reactor-regenerator system and the fluidized catalyst bed reactor-regenerator system. Both of these circulating bed systems are conventionally used in hydrocarbon conversion, e.g., hydrocarbon cracking, operations.

The catalyst system used in accordance with the teachings of the invention is comprised of a mixture of two types of solid particles. The form, i.e., particle size, of the present catalyst, e.g., both solid particles and discrete entities, is not critical to the present invention and may vary depending, for example, on the type of reaction-regeneration system employed. Such catalyst particles may be formed into any desired shape such as pills, cakes, extrudates, powders, granules, spheres and the like using conventional methods. Where, for example, the final catalyst is designed for use in hydrocarbon conversion operations employing a fixed bed of catalyst, the catalyst may preferably be formed into particles having a minimum dimension of at least about 0.01 inch and a maximum dimension up to about one-half inch or one inch or more. Spherical particles having a diameter of about 0.03 inch to about 0.25 inch, preferably about 0.03 inch to about 0.15 inch, are often useful, especially in fixed catalyst bed or moving catalyst bed operations. With regard to fluidized catalyst bed systems, it is preferred that the major amount by weight of the present catalyst particles have a diameter in the range of about 10 microns to about 250 microns, more preferably about 20 microns to about 150 microns.

The first solid particles are capable of promoting the desired hydrocarbon conversion and, preferably, are substantially free of added platinum group metal components.

The second solid particles, i.e., discrete entities, comprise (A) a major amount, i.e., at least 50%, by weight of alumina and (B) a minor amount of at least one platinum group metal component disposed on the alumina and capable of promoting the conversion of carbon monoxide to carbon dioxide at carbon monoxide oxidizing conditions, e.g., conditions existing during contacting the deposit-containing first solid particles with an oxygen-containing gaseous medium to combust at least a portion of the carbonaceous deposit material from the first solid particles.

The composition of the solid particles useful in the present invention is not critical, provided that such particles are capable of promoting the desired hydrocarbon conversion. Particles having widely varying compositions are conventionally used as catalysts in such hydrocarbon conversion processes, the particular composition chosen being dependent, for example, on the type of hydrocarbon chemical conversion desired. Thus, the solid particles suitable for use in the present invention include at least one of the natural or synthetic materials which are capable of promoting the desired hydrocarbon chemical conversion. For example, when the desired hydrocarbon conversion involves one or more of hydrocarbon cracking, disproportionation, isomerization, polymerization, alkylation and dealkylation, such suitable materials include acid-treated natural clays such as montmorillonite, kaolin and bentonite clays; natural or synthetic amorphous materials, such as amorphous silica-alumina, silica-magnesia and silica-zirconia composites; crystalline aluminosilicates, often referred to as zeolites or molecular sieves and the like. In certain instances, e.g., hydrocarbon cracking and disproportionation, the solid particles preferably include such crystalline aluminosilicates to increase catalytic activity. Methods for preparing such solid particles are conventional and well known in the art. For example, crystalline aluminosilicate compositions can be made from alkali metal silicates and alkali metal aluminates so that they initially contain significant concentrations of sodium. Sodium tends to reduce the catalytic activity of the composition for hydrocarbon conversion reactions such as hydrocarbon cracking and disproportionation. Accordingly, most or all of the sodium in the crystalline aluminosilicate is removed or replaced, e.g., with other metal cations such as calcium or aluminum ions or ions of the rare earths. This can be accomplished by ion exchanging the crystalline aluminosilicate with soluble compounds of calcium, aluminum or the rare earths. It may also be desirable to substitute at least some of the sodium ions with hydrogen ions. This can be acomplished by contacting the crystalline aluminosilicate with a source of hydrogen ions such as acids, or hydrogen precursors such as ammonium compounds. These procedures are thoroughly described in U.S. Pat. Nos. 3,140,253 and Re. 27,639.

Compositions of the solid particles which are particularly useful in the present invention are those in which the crystalline aluminosilicate is incorporated in an amount effective to promote the desired hydrocarbon conversion, e.g., a catalytically effective amount, into a porous matrix which comprises, for example, amorphous material which may or may not be itself capable of promoting such hydrocarbon conversion. Included among such matrix material are clays and amorphous compositions of silica-alumina, magnesia, zirconia, mixtures of these and the like. The crystalline aluminosilicate is preferably incorporated into the matrix material in amounts within the range of about 1% to about 75%, more preferably about 2% to about 50%, by weight of the total solid particles. The preparation of crystalline aluminosilicate-amorphous matrix catalytic materials is described in the above-mentioned patents.

As indicated above, the discrete entities utilized in the present invention comprise a major amount of alumina and a minor amount of at least one platinum group metal component disposed on the alumina and present in an amount sufficient to promote the oxidation of carbon monoxide to carbon dioxide. It is essential that the discrete entities include at least one separate alumina phase on which the platinum group metal is disposed. It is preferred that the discrete entities comprise a major amount of alumina having a surface area of from about 25 m.$^2$/gm. to about 600 m.$^2$/gm. or more. The alumina comprises a major amount, preferably at least about 70%, and more preferably at least 90%, by weight of the discrete entities. Suitable aluminas for use in the discrete entities are those aluminas derived from hydrous alumina predominating in alumina trihydrate, alumina monohydrate, amorphous hydrous alumina and mixtures thereof. Alumina in the form of chi-, gamma-, delta-, eta-, kappa-, and theta-alumina are preferred, while gamma- and eta-alumina are more preferred. Minor, substantially noninterferring proportions of other well known refractory materials, e.g., inorganic oxides such as silica, zirconia, magnesia and the like may be included in the present discrete entities. By "substantially non-interferring" is meant amounts of other materials which do not have a substantial deleterious effect on the present catalyst system or hydrocarbon conversion process. In one preferred embodiment, the present discrete entities further comprise a minor amount of at least one aluminosilicate capable of promoting the desired hydrocarbon conversion. Typical aluminosilicates have been described above. Preferably, such aluminosilicates comprise about 1% to about 20%, more preferably about 1% to about 10%, by weight of the discrete entities. The presence of such aluminosilicates in the present discrete entities acts to increase the overall catalytic activity of the solid particles-discrete entities mixture for promoting the desired hydrocarbon conversion.

The alumina may be synthetically prepared in any suitable manner and may be processed prior to use by one or more treatments including drying, calcination, steaming and the like. Thus, for instance, hydrated alumina in the form of a hydrogel can be precipitated from an aqueous solution of a soluble aluminum salt such as aluminum chloride. Ammonium hydroxide is a useful agent for effecting the precipitation. Control of the pH to maintain it within the values of about 7 to about 10 during the precipitation is desirable for obtaining a good rate of conversion. Extraneous ions, such as halide ions, which are introduced in preparing the hydrogel, can, if desired, be removed by filtering the alumina hydrogel from its mother liquor and washing the filter cake with water. Also, if desired, the hydrogel can be aged, say for a period of several days. The effect of such aging is to build up the concentration of alumina trihydrate in the hydrogel. Such trihydrate formation can also be enhanced by seeding an aqueous slurry of the hydrogel with alumina trihydrate crystallites, for example, gibbsite.

The alumina-based composition may be formed into particles of any desired shape such as pills, cakes, extrudates, powders, granules, spheres, and the like using conventional methods. The size selected for the particles can be dependent upon the intended environment in which the final discrete entities is to be used—as, for example, whether in a fixed catalyst bed or circulating catalyst bed reaction system.

As indicated above, the discrete entities utilized in the present invention also contain at least one platinum group metal component disposed on the alumina. The platinum group metal, such as platinum, may exist within the final discrete entities at least in part as a compound such as an oxide, sulfide, halide and the like, or in the elemental state. Generally, the amount of the platinum group metal component present in the final discrete entities is small compared to the quantity of the alumina. The platinum group metal component preferably comprises from about 0.05 parts-per-million (ppm.) to about 1%, more preferably about 0.05 ppm. to about 1,000 ppm., and still more preferably about 0.5 ppm. to about 500 ppm., by weight of the discrete entities, calculated on an elemental basis. Excellent results are obtained when the discrete entities contain about 50 ppm. to about 200 ppm., by weight of at least one platinum group metal component.

The platinum group component may be incorporated in the alumina based composition in any suitable manner, such as by coprecipitation or cogellation with the alumina, ion-exchange with the alumina and/or alumina hydrogel, or by the impregnation of the alumina and/or alumina hydrogel at any stage in its preparation and either after or before calcination of the alumina hydrogel. Preferably, the platinum group metal component is substantially uniformly disposed on the alumina of the present discrete entities. One preferred method for adding the platinum group metal to the alumina involves the utilization of a water soluble compound of the platinum group metal to impregnate the alumina prior to calcination. For example, platinum may be added to the alumina by comingling the uncalcined alumina with an aqueous solution of chloroplatinic acid. Other water-soluble compounds of platinum may be employed as impregnation solutions, including, for example, ammonium chloroplatinate and platinum chloride.

Both inorganic and organic compounds of the platinum group metals are useful for incorporating the platinum group metal component into the present discrete entities. Typically, such inorganic compounds include ruthenium nitrate, ruthenium chloride, rhodium trichloride, ammonium palladium hexachloride, palladium chloride, diamminedichloropalladium, diamminedinitropalladium, tetraamminepalladium chloride, tetraamminepalladium hydroxide, palladium nitrate, palladium acetate, osmium tetroxide, ammonium platinum hexachloride, diamminodichloroplatinum, diamminedinitroplatinum, tetraammineplatinous hydroxide, tetraammineplatinous hydroxide and the like. Platinum group metal compounds, such as chloroplatinic acid, palladium chloride, are preferred.

Representative organic metal-containing compounds which can be used to incorporate the platinum group metal component into the discrete entities include ruthenocene, tricarbonyltris (triphenylphosphino) ruthenium, palladium acetylacetonate, tetrakis (triphenylphosphino) palladium, dichloro (ethylene) palladium (II) dimer, $\pi$-cyclopentadinyldicarbonylosmium (I) dimer, platinum acetylacetonate, dichlorodicarbonylplatinum (II), trimethylplatinum chloride, dichlorotetracarbonyldirhodium (I), chlorocarbonylbis(tri-phenylphosphino) rhodium (I), triiiodotricarbonyliridium (III), trichlorobis(trichlorophosphino) iridium (III) and the like.

It may be desirable to be able to separate the discrete entities from the solid particles, for example, when it is desired to use the solid particles alone for hydrocarbon conversion or where it is desired to recover the discrete entities for other uses or for platinum group metal recovery. This can be conveniently accomplished by preparing the second solid particles in a manner such that they have a different size than the first solid particles. The separation of the first and second solid particles can then be easily effected by screening or other means of size segregation.

Although this invention is useful in many hydrocarbon chemical conversions, the present catalyst, i.e., mixture comprising solid particles and discrete entities, and process find particular applicability in systems for the catalytic cracking of hydrocarbons and the regeneration of catalysts so employed. Such catalytic hydrocarbon cracking often involves converting, i.e., cracking, heavier or higher boiling hydrocarbons to gasoline and other lower boiling components, such as hexane, hexene, pentane, pentene, butane, butylene, propane, propylene, ethane, ethylene, methane and mixtures thereof. Often, the substantially hydrocarbon feedstock comprises a gas oil fraction, e.g., derived from petroleum, shale oil, tar sand oil, coal and the like. Such feedstock may comprise a mixture of straight run, e.g., virgin, gas oil. Such gas oil fractions often boil primarily in the range of about 400° F. to about 1000° F. Other substantially hydrocarbon feedstocks, e.g., other high boiling or heavy fractions of petroleum, shale oil, tar sand oil, coal and the like, may be cracked using the apparatus and method of the present invention. Such substantially hydrocarbon feedstock often contain minor amounts of contaminants, e.g., sulfur, nitrogen and the like.

Hydrocarbon cracking conditions are well known and often include temperatures in the range of about 850° F. to about 1100° F., preferably about 900° F. to about 1050° F. Other reaction conditions usually include pressures of up to about 100 psig.; catalyst to oil ratios of about 1 to 5 to about 25 to 1; and weight hourly space velocities (WHSV) of from about 3 to about 60. These hydrocarbon cracking conditions are not critical to the present invention and may be varied depending, for example, on the feedstock and solid particles being used and the product or products wanted.

In addition, the catalytic hydrocarbon cracking system includes a regeneration zone for restoring the catalytic activity of the solid particles of catalyst previously used to promote hydrocarbon cracking. Carbonaceous deposit-containing catalyst particles from the reaction zone are contacted with free oxygen-containing gas in the regeneration zone at conditions to restore or maintain the activity of the catalyst by removing, i.e., combusting, at least a portion of the carbonaceous material from the catalyst particles. The conditions at which such contacting takes place are not critical to the present invention. The temperature in the catalyst regeneration zone of a hydrocarbon cracking system is often in the range of about 900° F. to about 1500° F., preferably about 900° F. to about 1300° F. and more preferably about 1100° F. to about 1300° F. Other conditions within such regeneration zone include, for example, pressures up to about 100 psig., average catalyst contact times within the range of about 3 minutes to about 120 minutes, preferably from about 3 minutes to about 75 minutes. Sufficient oxygen is preferably present in the regeneration zone to completely combust the carbonaceous deposit material, for example, to carbon dioxide and water. The amount of carbonaceous material deposited on the catalyst in the reaction zone is preferably in the range of about 0.005% to about 15%, more preferably about 0.1% to about 10%, by weight of the catalyst. At least a portion of the regenerated catalyst is often returned to the hydrocarbon cracking reaction zone.

The solid particles useful in the catalytic hydrocarbon cracking embodiment of the present invention may be any conventional catalyst capable of promoting hydrocarbon cracking at the conditions present in the reaction zone, i.e., hydrocarbon cracking conditions. Similarly, the catalytic activity of such solid particles is restored at the conditions present in the regeneration zone. Typical among these conventional catalysts are those which comprise amorphous silicaalumina and at least one crystalline aluminosilicate having pore diameters of about 8 A to about 15 A and mixtures thereof. When the solid particles and/or discrete entities to be used in the hydrocarbon cracking embodiment of the present invention contain crystalline aluminosilicate, the compositions may also include minor amounts of conventional metal promotors such as the rare earth metals, in particular, cerium.

The catalyst, i.e., mixture comprising solid particles and discrete entities, and process of the invention can be beneficially used for the disproportionation of paraffinic or aromatic hydrocarbons. For example, the present invention is well adaptable to the disproportionation of paraffinic hydrocarbons containing about 3 to about 20 carbon atoms per molecule and aromatic hydrocarbons containing one or two rings and from 7 to about 18 carbon atoms per molecule. The process of the invention is particularly useful for the disproportionation of methyl benzenes containing 7 to about 10 carbon atoms per molecule and is especially useful for the disproportionation of toluene to mixed xylenes and benzene. When disproportionating specific hydrocarbons it is often desirable to add a higher molecular weight hydrocarbon to the feedstock for the purpose of increasing the yield of a desired product. For example, when disproportionating toluene to benzene and mixed xylenes the yield of xylenes can be increased by introducing higher methyl-benzenes with the toluene feed. These higher methyl-benzenes usually have 9 to 10 carbon atoms and 1 to 4 methyl groups, and thus other alkyl groups such as ethyl or propyl groups may be present. Thus, the aromatic streams available as a source of methyl groups for alkylation of toluene frequently do not consist only of methylaromatics. For example, the $C_9+$ product obtained from a xylene isomerization process normally contains substantial ethyl (and possibly higher alkyl) ring substituents. Ethyl or higher alkylaromatic substituents tend to crack more readily than methyl groups to form olefins and the parent aromatic ring. Higher temperatures also promote the cracking reaction. As a result, the preferred conditions for a particular operation can be dependent on the composition of the $C_9+$ stream, the extent to which the $C_9+$ stream is recycled, and the ratio of benzene to xylenes desired in the product. In a process involving recycle, the ethyl substituents may also be controlled by fractionating and removing a portion of the stream rich in n-propylbenzenes and ethyltoluenes, or rich in ethylxylenes. The C$_9$+ hydrocarbons can be obtained from various sources such as naphtha reformate and coal tar, and in addition, the concentration of aromatics in the hydrocarbon streams can be increased by fractionation or solvent extraction procedures. Thus, trimethylbenzenes, for example, those formed as byproducts of the disproportionation reaction, can be incorporated in the toluene feed, thus effecting additional xylene production through transalkylation. The amount of the higher methylaromatics added to the feed, either from an external supply or by recycling, can be a small amount effective to increase the xylene/benzene ratio in the product, as about 5 to 60, preferably about 15 to 50, weight percent based on the toluene fed to the reaction zone.

In accordance with a preferred embodiment a hydrocarbon feedstock, such as toluene, which is in the vapor phase is disproportionated in a moving catalyst bed reactor in which the catalyst comprises a mixture of about 80 to 99% by weight of solid particles which contain about 5% to 50% of a crystalline aluminosilicate having a pore size of at least 5 A disposed in a porous matrix of silica-alumina and about 1% to about 20% of discrete entities comprising about 1% to about 20% by weight of a crystalline aluminosilicate of substantially the same pore size as the crystalline aluminosilicate included in the solid particles, at least about 80% by weight of alumina and about 0.05 ppm. to about 1000 ppm. by weight of at least one platinum group metal component disposed substantially uniformly in the alumina. The disproportionation reaction zone is preferably operated at a temperature of about 700° F. to about 1200° F. and more preferably about 800° F. to about 1000° F. and preferably at approximately atmospheric pressures such as about 0 psig. to about 30 psig. The catalyst holding time, i.e., the average length of time that the catalyst remains in the reaction zone is preferably kept in the range of about 6 to about 240 and more preferably about 12 to about 120 minutes.

After the catalyst particles leave the disproportionation reaction zone they enter the catalyst regeneration zone where at least a portion of the carbonaceous substances which were deposited on the catalyst particle surfaces during the disproportionation reaction are removed. This is accomplished by contacting the catalyst with an oxygen-containing gas stream, such as air, at temperatures preferably in the range of about 800° F. to about 1500° F. and more preferably about 900° F. to about 1200° F. The temperature and flow rate of the oxygen-containing gas stream is preferably such that the temperature in the regeneration zone is maintained in the preferred temperature range specified above.

The following examples clearly illustrate the present invention. However, these examples are not to be interpreted as specific limitations on the invention.

EXAMPLE I

This example illustrates certain of the advantages of the present invention.

A quantity of alumina-based particles of substantially pure gamma alumina, which is derived from a mixture of alumina monohydrate and amorphous hydrous alumina, in the shape of spheres having a diameter of about 1/16-174 inch is charged into a vessel equipped with means for evacuating the vessel. These spheres can be obtained, for example, by the conventional oil-drop method. The vessel is evacuated and maintained under a vacuum of about 28 inches Hg for 20 minutes. An aqueous solution of chloroplatinic acid is introduced into the vessel and the vessel is agitated sufficiently to effect a substantially uniform distribution of the platinum on the alumina particles. The concentration of chloroplatinic acid in the solution is sufficient to impregnate the alumina with about 100 ppm., based on weight, of platinum, calculated as elemental platinum. The resulting discrete entities are dried in a hot air stream for three hours and then calcined in an air stream at 1200° F. for one hour.

EXAMPLE II

Example I is repeated except that substantially all of the alumina based particles have diameters in the range of about 50 microns to about 100 microns. Such particles can be obtained by conventional spray drying techniques. As in Example I, the final discrete entities contain about 100 ppm. of platinum, by weight of the total discrete entities, calculated as elemental platinum. Also, as in Example I, the platinum is substantially uniformly distributed in the discrete entities.

EXAMPLE III

A quantity of solid particles of a commercially available hydrocarbon conversion catalyst containing about 6% by weight of crystalline aluminosilicate, about 54% by weight amorphous silica-alumina and 40% by weight alpha alumina, and having the same approximate size as the discrete entities from Example I, is combined with the discrete entities of Example I so that a mixture of 5 parts by weight of discrete entities and 95 parts by weight of the solid particles results. The catalytic activity of the solid particles is equilibrated by using same (prior to combining with the discrete entities) in commercial moving-bed hydrocarbon conversion service.

The mixture of solid particles and discrete entities is loaded to a conventional TCC moving catalyst bed reactioncatalyst regeneration system. Briefly, this system causes catalyst particles to flow by gravity from a supply hopper through a reaction zone, where the catalyst is contacted with hydrocarbon feedstock at hydrocarbon conversion conditions and the desired hydrocarbon chemical conversion takes place. The catalyst then flows to a catalyst regeneration zone where the catalyst is contacted with an oxygen-containing gaseous medium to combust at least a portion of the catalyst carbonaceous deposits which are formed in the reaction zone. The regenerated catalyst leaves the regeneration zone and is air lifted back to the supply hopper and the cycle is repeated.

Toluene is disproportionated in this moving catalyst bed reactor system loaded with the catalyst mixture. The catalyst is advanced through at a rate such that each particle has an average residence time in the reaction zone of about 50 minutes. With equilibrium conditions achieved the reaction zone temperature is maintained at about 955° F. and a reaction zone pressure of between about 5 psig. and about 20 psig. is maintained. Toluene is fed into the reactor at a weight hourly space velocity (WHSV) of about 1.3. Air is fed to the catalyst regeneration zone which is maintained at conditions to combust at least a portion of the carbonaceous catalyst deposit material, e.g., temperature of about 1000° F. to 1100° F. and average catalyst residence time of about 50 minutes.

After a period of time in operation, it is determined that the catalyst mixture according to the present invention is effective both to promote toluene disproportionation in the reaction zone and to promote the oxidation of carbon monoxide to carbon dioxide in the regeneration zone. The catalyst mixture of this invention is found to provide improved results, e.g., improved carbon monoxide oxidation catalytic activity stability while having substantially no deleterious effect on the hydrocarbon conversion in the reaction zone.

EXAMPLE IV

Example I is repeated, except that the alumina-based spheres include about 7% by weight of a crystalline aluminosilicate known to be catalytically active to promote hydrocarbon conversion.

EXAMPLE V

Example III is repeated except that the discrete entities produced in Example I are replaced by the discrete entities of Example IV. After a period of time in toluene disproportionation-catalyst regeneration service, this catalyst mixture is shown to be effective to promote both toluene disproportionation in the reaction zone and carbon monoxide oxidation in the regeneration zone.

EXAMPLES VI AND VII

Examples III and V are repeated except that the catalyst mixtures are used to crack a petroleum derived gas oil fraction, a combined fresh feed and recycle stream, in the moving catalyst bed reaction-regeneration system. The fresh gas oil fraction boils in the range of about 400° F. to about 1000° F. and is substantially hydrocarbon in nature, containing minor amounts of sulfur and nitrogen as contaminants. Conventional hydrocarbon cracking and catalyst regeneration conditions are employed in the reaction zone and regeneration zone, respectively.

The catalyst mixtures are found to be effective to promote hydrocarbon cracking and to promote carbon monoxide oxidation. Such hydrocarbon cracking operation provides improved results, e.g., prolonged carbon monoxide oxidation catalytic activity while providing for effective hydrocarbon cracking catalytic activity.

EXAMPLE VIII

The discrete entities produced in Examples II are intimately comingled with solid particles of commercially available hydrocarbon cracking catalyst similar to that used in Example III except that the substantially all, by weight, of the particles have diameters in the range of about 20 microns to about 150 microns. The hydrocarbon cracking catalytic activity of such particles is equilibrated by service in a conventional commercial fluid-bed catalyst cracking (FCC) unit. The resulting catalyst mixture includes 5 parts by weight of discrete entities and 95 parts by weight of the solid particles.

This catalyst mixture is used to crack a petroleum derived gas oil stream, similar to that described in Examples VI and VII, to lower boiling hydrocarbons in a conventional FCC unit.

Briefly, such unit involves two vessels in at least limited fluid communication with each other. One vessel serves as a reaction zone. Hydrocarbon feedstock and catalyst particles are fed to the reaction zone at hydrocarbon cracking conditions. At least a portion of the hydrocarbon cracking occurs in this reaction zone, where the catalyst and hydrocarbon form a fluid phase or bed.

Catalyst and hydrocarbon are continuously drawn from the reaction zone. The hydrocarbon is sent for further processing, distillation and the like. Catalyst, stripped of hydrocarbon, flows to the other vessel, catalyst regeneration zone, where it is combined with air at proper conditions to combust at least a portion of the carbonaceous deposits from the catalyst formed during the hydrocarbon cracking reaction. The catalyst and vapors in the regeneration zone form a fluid phase or bed. Catalyst is continuously removed from the regeneration zone and is combined with the hydrocarbon feedstock prior to being fed to the reaction zone.

The weight ratio of catalyst particles to total (fresh plus recycle) hydrocarbon feed entering the reaction zone is about 8 to 1. Other conditions within the reaction zone include:

Temperature, °F.: 930
Pressure, psig.: 8
WHSV: 15

Such conditions result in about 70% by volume conversion of the gas oil feedstock to products boiling at 400° F. and below.

The catalyst particles from the reaction zone include about 1.5% by weight of carbonaceous deposit material which is at least partially combusted in the regeneration zone. Air, in an amount so that amount of oxygen in the regeneration zone is about 1.15 times the amount theoretically required to completely combust this deposit material, is heated to the desired temperature before being admitted to the regeneration zone. Conditions within the regeneration zone include:

Temperature, °F.: 1150
pressure, psig.: 8
Average Catalyst Residence Time,min.: 12

After a period of time, the catalyst is shown to remain effective to promote both hydrocarbon cracking in the reaction zone and carbon monoxide oxidation in the regeneration zone.

One additional feature of the present invention illustrated by the above Example involves the processing of sulfur contaminated hydrocarbon feedstock. For example, fresh hydrocarbon feedstocks, e.g., petroleum derived gas oils, often contain about 0.01% to about 5% or more, preferably from about 0.1% to about 3%, by weight of sulfur. Such feedstocks form carbonaceous deposits on the catalyst which also contain sulfur. During regeneration of such catalyst by contacting with an oxyen-containing gaseous stream, at least a portion of this deposit sulfur is oxidized to sulfur dioxide and, ordinarily, leaves the system with combustion flue gases. It is now found that the presence of at least one platinum group metal component in the catalyst regeneration zone acts to promote the further oxidation of sulfur and sulfur-containing compounds to $SO_3$. The $SO_3$ thus formed, associates with the alumina of the discrete entities, until such entities are placed in a hydrocarbon chemical conversion reaction zone environment. Under such reaction zone conditions, at least a portion of this sulfur trioxide is converted to $H_2S$ which is removed from the reaction zone with the hydrocarbon conversion products. Thus, in this embodiment, i.e., when processing a sulfur contaminated hydrocarbon feedstock, the present catalyst and process provide for reduced sulfur dioxide emissions from the regenerator zone combustion flue gases.

EXAMPLES IX

Example VIII is repeated except that the discrete entities employed include about 7% by weight of a crystalline aluminosilicate known to be catalytically active to promote hydrocarbon cracking.

The present catalyst and process provide improved properties and results. For example, the present alumina-based discrete entities have outstanding carbon monoxide oxidation catalytic activity stability. That is, the time rate decline of carbon monoxide oxidation catalytic activity of the present catalyst is reduced. Clearly, the present catalyst and process provide for improved hydrocarbon chemical conversion.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. In a process for converting a hydrocarbon feedstock which comprises (1) contacting said feedstock in at least one reaction zone with solid particles substantially free of added platinum group metal components and capable of promoting the conversion of said feedstock at hydrocarbon conversion conditions to produce at least one hydrocarbon product and to cause deactivating carbonaceous material to be formed on said solid particles, thereby forming deposit-containing particles; (2) contacting said deposit-containing particles in at least one regeneration zone with an oxygen-containing vaporous medium at conditions to combust at least a portion of said carbonaceous deposit material to thereby regenerate at least a portion of the hydrocarbon conversion catalytic activity of said solid particles and to form at least one carbonaceous deposit material combustion product; and (3) repeating step (1) and (2) periodically, the improvement which comprises: circulating between said reaction zone and said regeneration zone in intimate admixture with and separate from said solid particles, a minor amount of discrete entities comprising (A) a major amount by weight of alumina, (B) a minor, catalytically effective amount of at least one platinum group metal component disposed on said alumina, said metal component being capable of promoting the oxidation of carbon monoxide to carbon dioxide at the conditions of step (2), and (C) a minor catalytically effective amount of at least one crystalline aluminosilicate capable of promoting hydrocarbon conversion at the conditions of step (1), thereby promoting the oxidation of carbon monoxide to carbon dioxide in said regeneration zone.

2. The process of claim 1 wherein the hydrocarbon conversion is carried out in the substantial absence of added free molecular hydrogen.

3. The process of claim 1 wherein said conversion comprises hydrocarbon cracking.

4. The process of claim 3 wherein said platinum group metal component is present in an amount of about 0.05 ppm. to about 1% by weight of discrete entities, calculated as elemental metal.

5. The process of claim 4 wherein said discrete entities contain at least about 70% by weight of alumina.

6. The process of claim 3 wherein said feedstock contains a minor amount of sulfur.

7. The process of claim 4 wherein said feedstock contains a minor amount of sulfur.

8. The process of claim 5 wherein the relative amounts of said solid particles and said discrete entities are in the range of about 80 parts to about 99 parts and about 1 to about 20 parts by weight, respectively.

9. The process of claim 8 wherein said feedstock contains a minor amount of sulfur.

10. The process of claim 8 wherein said platinum group metal component is present in an amount of about 0.05 ppm. to about 1000 ppm. by weight of the total discrete entities, calculated as elemental metal.

11. The improved process of claim 10 wherein said platinum group metal component comprises a metal selected from the group consisting of platinum, palladium and mixtures thereof.

12. The process of claim 4 wherein said platinum group metal component comprises a metal selected from the group consisting of platinum, palladium and mixtures thereof and is present in an amount of about 0.05 ppm. to about 1000 ppm. by weight of the total discrete entities, calculated as elemental metal.

13. The process of claim 11 wherein said solid particles comprise a catalytically effective amount of at least one crystalline aluminosilicate capable of promoting said hydrocarbon conversion at the conditions of step (1), said platinum group metal component is substantially uniformly disposed on said alumina of said discrete entities, and the relative amounts of said solid particles and said discrete entities are in the range of about 90 parts to about 99 parts and about 1 part to about 10 parts by weight, respectively.

14. The process of claim 12 wherein said solid particles comprise a catalytically effective amount of at least one crystalline aluminosilicate capable of promoting said hydrocarbon conversion at the conditions of step (1), said platinum group metal component is substantially uniformly disposed on said alumina of said discrete entities, and the relative amounts of said solid particles and said discrete entities is in the range of about 90 parts to about 99 parts and about 1 part to about 10 parts by weight, respectively.

15. The process of claim 12 wherein said feedstock contains a minor amount of sulfur.

16. The process of claim 14 wherein said feedstock contains a minor amount of sulfur.

* * * * *